United States Patent
Solum

(12) United States Patent     (10) Patent No.: US 7,035,671 B2
Solum     (45) Date of Patent: Apr. 25, 2006

(54) METHOD AND APPARATUS FOR INTELLIGENT NOISE REDUCTION IN A DISTRIBUTED COMMUNICATION SYSTEM

(75) Inventor: Jeffrey Solum, Deephaven, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 278 days.

(21) Appl. No.: 10/118,071

(22) Filed: Apr. 8, 2002

(65) Prior Publication Data

US 2004/0203394 A1    Oct. 14, 2004

(51) Int. Cl.
*H04B 1/38*    (2006.01)

(52) U.S. Cl. .................. 455/562.1; 455/133; 455/137; 455/278.1; 455/63.1

(58) Field of Classification Search ............. 455/562.1, 455/132–137, 140, 272–273, 277.1–277.2, 455/278.1, 63.1; 375/347
See application file for complete search history.

(56) References Cited

U.S. PATENT DOCUMENTS

| 6,442,405 B1 * | 8/2002 | Hiramatsu et al. ........ 455/562.1 |
| 6,622,013 B1 * | 9/2003 | Miyoshi et al. ........... 455/277.2 |
| 2003/0060178 A1 * | 3/2003 | Ghassemzadeh et al. 455/277.1 |

FOREIGN PATENT DOCUMENTS

WO     WO 00/21221     * 4/2000

* cited by examiner

*Primary Examiner*—Lee Nguyen
(74) *Attorney, Agent, or Firm*—Fogg & Associates, LLC; David N. Fogg

(57) ABSTRACT

A wireless distribution system includes a number of remote units distributed in a coverage area to receive wireless signals and to provide the signals through the distribution system to input ports of an expansion unit where the signals are combined, detectors operatively connected to one or more of the plurality of input ports to determine the presence of information carrying signals at the input ports, a number of selection circuits to select signals in which information has been detected, and a node to combine the selected signals.

17 Claims, 3 Drawing Sheets

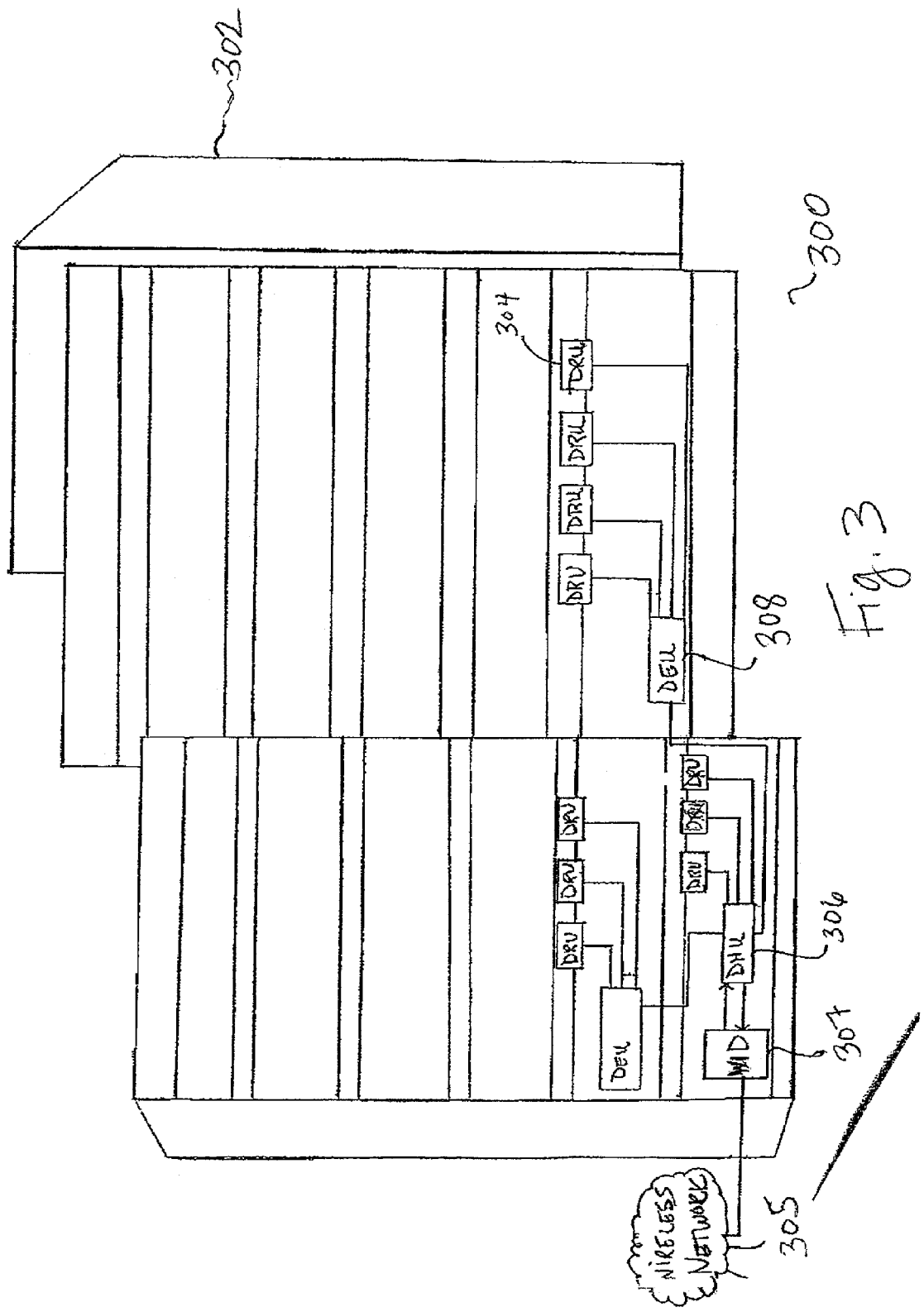

METHOD AND APPARATUS FOR INTELLIGENT NOISE REDUCTION IN A DISTRIBUTED COMMUNICATION SYSTEM

TECHNICAL FIELD

The present invention is related to a distributed communications system, and more particularly to a method and apparatus for noise reduction in a distributed communication system that may be implemented in a multipoint-to-point communication system in which wireless (radio frequency or otherwise) signals are distributed in buildings or other areas where wireless signal propagation is likely to be a problem.

BACKGROUND INFORMATION

The operational range of a system that combines and distributes signals within buildings or other areas where wireless signal propagation is likely to be a problem, whether the signals are digital or analog or some combination of both, is limited by the dynamic range handling capability of the system. Background noise effectively limits the dynamic range of a system. In a distributed system, such as the one disclosed in U.S. patent application Ser. No. 09/619,431, "Point-To-Point Digital Radio Frequency Transport," filed on Jul. 19, 2000 (Attorney Docket No. 100.01 9US01), incorporated herein by reference as if fully set forth, signals of varying levels as well as background noise, are present at input ports, at signal combiners and at output ports. When combining signals from various antennas and other input ports and remote units, with or without individual amplifiers, the noise floor of the system generally increases by 10 log N, where N is the number of signals being combined. The problem is exacerbated when signals are combined from RF receivers that each have a given noise figure and the combined signals may contain aliases, images and spurs of the background noise due to sampling effects, frequency translation and the like. If such signals are combined in a purely additive way without regard to whether any useful information is present, the overall noise performance of the system will suffer. It would thus be desirable to intelligently select input signals so that overall system noise may be reduced.

The above-mentioned problems with noise performance in distributed communication systems within buildings and other enclosed areas, as well as other problems, are addressed by the present invention and will be understood by reading and studying the following specification.

BRIEF DESCRIPTION OF THE INVENTION

FIG. 3 is an illustration of one embodiment of a point-to-multipoint communication system according to the teachings of the present invention.

SUMMARY

A wireless distribution system according to one aspect of the present invention includes a plurality of remote units distributed in a coverage area to receive wireless signals in the coverage area and provide the signals to a plurality of input ports to receive signals comprising the signals provided by the plurality of remote units, a plurality of intelligent detectors operatively connected to one or more of the plurality of input ports to intelligently determine whether signals at the input ports carry any useful information, a plurality of selection circuits to select signals identified by the plurality of intelligent detectors as carrying useful information, and a node to combine the plurality of selected signals.

DETAILED DESCRIPTION

In the following detailed description of the preferred embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

Figure 1:
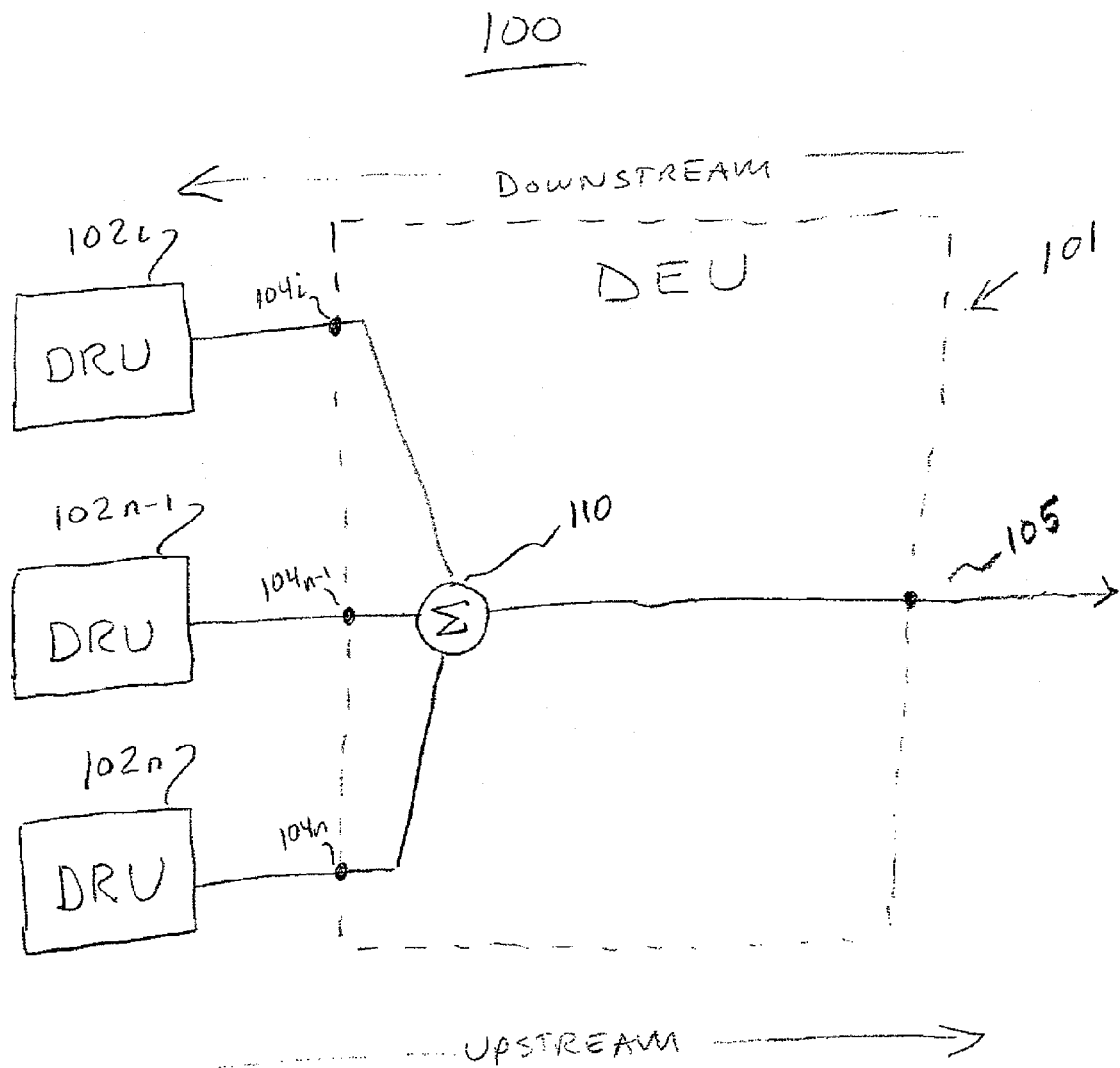
FIG. 1 is an illustration of one example of a distributed intelligent noise reduction system according to the teachings of the present invention.

FIG. 1 is an illustration of a representative system 100 for distribution of wireless signals in a difficult environment for wireless signal propagation, such as in a large building or enclosure. Embodiments of the present invention are not limited to wireless signal propagation in and around buildings or other enclosures but are applicable to enhanced wireless systems for any appropriate coverage area. While wireless systems typically provide bi-directional communications, embodiments of the present invention provide enhanced upstream signal handling.

The system 100 includes a number of digital remote units (DRUs) $102_i$ to $102_n$ that receive a frequency spectrum of wireless signals such as may be transmitted by low power wireless devices in and around the building. In some embodiments, these include wireless signals in compliance with one or more of AMPS, PCS, GSM, TDMA, CDMA, and other similar wireless communication protocols. In general, the DRUs process the spectrum of wireless signals so that the spectrum can be transmitted over transmission links $104_i$ to $104_n$, which may include one or more transmission media such as fiber optic, coaxial, twisted pair or simple copper wire, wireless link, or other medium of information transmission, and interface devices for such media or combinations thereof. The signals may be processed before, during and after transmission over the transmission links $104_i$ to $104_n$ to improve signal characteristics and propagation over the transmission media. Processing of the signals may include analog to digital conversion, analog and digital filtering, mixing and frequency translation, amplification and other well-known signal processing techniques. The transmission links $104_i$ to $104_n$ terminate at a node 110 of digital expansion unit (DEU) 101 where the signals are combined. Signals combined at node 110 can originate from the various DRUs 102 as well as from other upstream nodes such as DEUs, which also combine signals from DRUs or other DEUs.

One way to limit the total amount of system noise is to limit signals that are combined to those that actually carry useful information. One simple way to do this is to compare the incoming signal with a noise floor threshold. Signals that are above the threshold likely contain useful information and are permitted to pass. Those that fall below the threshold are unlikely to contain any useful information and are blocked so that they are not combined with other signals. In general, a useful, information carrying radio frequency (RF) signal, i.e., a signal that is capable of being demodulated, will have a minimum signal to noise ratio (SNR). An information carrying signal may be detected by determining whether signal power or SNR within a certain frequency range exceeds a predefined threshold level for a sufficient duration of time.

The minimum SNR will depend on the type of modulation. For example, a higher SNR will generally be needed to demodulate a carrier-based modulated signal than a non-carrier based modulated signal. For example, a non-carrier based spread spectrum signal (such as a code division multiple access (CDMA) modulated signal) or an ultra-wide bandwidth (UWB) signal may be demodulated in the presence of a great deal of noise and is often extremely difficult to distinguish from noise, particularly for ordinary narrowband receivers. Every CDMA modulated signal uses a very wide frequency spectrum, with separate encoding to identify the signals. Each signal is modulated by a preselected pseudo-random or pseudo-noise (PN) sequence—direct sequence and frequency hopping are the two most common methods—that rapidly cycles the original signal through multiple individual narrowband slots. The resulting signals have the appearance of noise but may be demodulated with the appropriate PN key. Every time a CDMA signal is added to the system, the noise floor rises. But the amount of noise that each CDMA signal adds to the noise floor is not constant. It is a function of the location of the CDMA transmitter, power output and the amount of information the CDMA signal is carrying, which may vary from moment to moment. Thus, as will be explained in greater detail below, detecting the presence of some forms of information-bearing signals may require processing and/or demodulation.

One example of a digital expansion unit (DEU) in a distributed communication system according to the present invention is shown in FIG. 1. DEU 101 includes a node 110 for summing upstream signals received on transmission links $104_i$ to $104_n$ from DRUs $102i$ to $102n$. After the signals are combined at node 110, the combined signals are fed to transmission link 105 which provides the combined signals to another node or nodes in the system.

While the system of FIG. 1 shows only one DEU, it should be understood that many such DEUs may be included in a large distributed communication system. For example, FIG. 3 shows a larger distributed communication system 300 in a complex of buildings 302. As shown in FIG. 3, bi-directional transport of RF signals is accomplished through a network of DRU's 304 which are positioned throughout the coverage area System 300 includes a digital host unit (DHU) 306, which interfaces with a wireless network 305 via a wireless interface device (WID) 307. DHU 306 is coupled to the public switched telephone network (PSTN), or a mobile telecommunications switching office (MTSO) or other switching office/network. DEU 308 is situated between the DHU 306 and one or more DRUs. In the forward path, DEU 308 expands the coverage area by splitting signals received from DHU 306 to a plurality of DRUs 304. In the reverse path, DEU 308 receives signals from a plurality of DRUs 304, sums the signals together and transports them to a DHU 306 or another DEU such as DEU 308. The system allows for successive branching of signals using DEUs 308 and expanded coverage to multiple DRUs 304.

Figure 2:
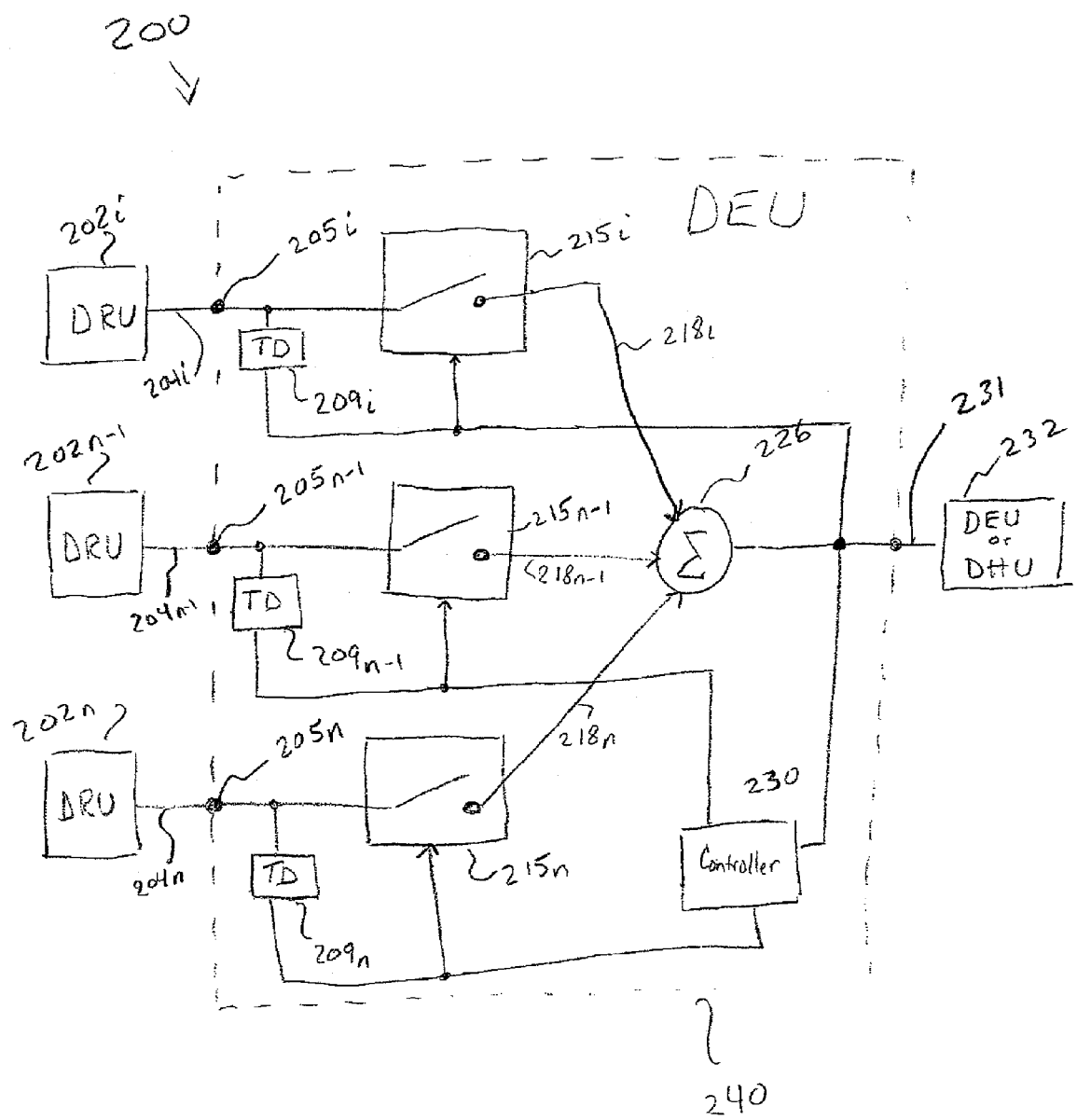
FIG. 2 is a block diagram of one example of a distributed intelligent noise reduction system according to the teachings of the present invention.

FIG. 2 is an illustration of one example of a circuit for intelligent noise reduction in a distributed communication system according to the present invention. System 200 includes control of the switching on and off of upstream signals from components that are distributed in a coverage area of a multiple point to point wireless system. The system 200 includes a number of digital remote units $202_i$ to $202_n$ that receive wireless signals and process them for delivery upstream over transmission links $204_i$ to $204_n$. In general such transmission links may be fiber optic, coaxial, twisted pair, wireless, or other medium of information transmission, or combination thereof. Each DRU $202_i$ to $202_n$ includes an input port or receiver that receives, processes and digitizes a wireless bandwidth. In one example each DRU receives the same wireless bandwidth. The DRUs $202_i$ to $202_n$ transmit the digitized signals upstream to a digital expansion unit (DEU) or to a digital host unit (DHU) that includes summing junction 226. Summing junction 226 sends the summed digitized signals to another DEU or a digital host unit 232 (DHU) located further upstream.

DEU 240 has a number of input ports $205_i$ to $205_n$ for receiving transmission links $204_i$ to $204_n$ from each DRU or DEU located downstream from DEU 240. Each input port $205_i$ to $205_n$ has associated with it a detector $209_i$ to $209_n$ to determine whether the levels of signals received over transmission links $204_i$ to $204_n$ exceed a predetermined threshold or otherwise match a pattern that is characteristic of information carrying signals. Detectors $209_i$ to $209_n$ may be operatively coupled to switches $215i$ to $215n$ so that transmission links $204i$ to $204n$ are switched online or offline in response to the detection or absence of useful signals by the detectors 209. In one example of the present invention the outputs of detectors $209i$ to $209n$ may be used to directly operate the switches $215i$ to $215n$ whenever a predetermined signal level threshold has been exceeded on an associated transmission link.

In many communication systems, it is valid to assume that signal levels above a predetermined threshold will contain useful information. For example, in the case of cellular signals, only licensed carriers and their subscribers have authorized use of this band. Therefore, it can be assumed that power detected above a certain threshold above the ambient noise floor of the receiver is useful. Even if a remote unit is left off at the onset of a new signal, the signal will eventually increase as the cell phone attempts to contact the base station. This signal will exceed the predetermined threshold of a nearby remote and will cause the DRU remote or the DEU to allow the signal to be combined.

The additional noise power as remote units are added to the system may be expressed by the equation Overall system Noise Figure=$NF+10 \log N$ where N is the number of remote units and NF is the noise figure of a single remote in a complete end to end system.

The SNR threshold may be determined in various ways. For example, the threshold may be determined during initial installation or during a low usage time. Power thresholds may in general be computed as follows:

$$Power = \frac{1}{N}\sum_{n=0}^{N} X_n^2$$

where N is the number of samples and X are the samples. An ambient noise threshold may then be compared with a signal threshold. N should be a sufficient number of records to ensure a complete timeslot reuse.

$N=f_s T$ where $f_s$ is the sample rate and 1 ms $\leq T \leq 100$ ms.

Once useful information has been detected, the signals are provided via transmission links $204i$ to $204n$ to node 226 via transmission links $218_i$ to $218_n$. Node 226 digitally sums the signals from transmission links $218_i$ to $218_n$. The output signal fed to transmission link 231 is the combined signals of $218_i$ to $218_n$.

In an alternative example of the present invention, signals from detectors $208_i$ to $208_n$ may be provided to controller/processor 230 for processing to determine if useful information is present. For example, if spread spectrum signals are present in the coverage area, in a controller based intelligent detection system, the controller/signal processor may scan the RF spectrum of interest on each transmission link to look for the presence of information carrying signals. A simple threshold detector that indicates signals are present whenever the noise floor rises above a predetermined level may be sufficient to detect the presence of spread spectrum signals in some applications.

Alternatively, in applications where it is necessary to detect signals that may not cause a detectable rise in the noise floor, demodulation may be employed as part of the detection process. Thus, as signals from a particular transmission link are selected, they may be downconverted to baseband, despread, decoded, demodulated and otherwise processed to determine if useful information is present.

In another example of the invention, information carrying signals may be detected by multiplying or autocorrelating the signal with a delayed version of itself followed by spectral analysis to detect the presence of information. If the chip rate of the spread spectrum signals to be detected are not known, it may be necessary to scan over a range of delays approximating the chip rates of signals that are likely to be present. Upon detecting useful information on a transmission link, controller 230 may provide a control signal to switch the appropriate transmission link online. Controller 230 may be a dedicated controller or signal processor physically located in DEU 240, or may be part of a larger system-wide central controller or processor. The process of determining whether useful signals are present on transmission links $204i$ to $204n$ and signal switches $215i$ to $215n$ must be updated at a sufficient frequency so that useful information is not lost.

CONCLUSION

A distributed wireless intelligent noise reduction system has been described. The distributed wireless intelligent noise reduction system includes a number of remote units distributed in a coverage area to receive wireless signals in the coverage area, a number of input ports to receive signals from the remote units, input signal detectors operatively connected to each of the input ports to determine the presence of information bearing signals received at each input port, selection circuits to select the information bearing signals, and a node to combine a plurality of the signals selected from the plurality of input ports.

Although specific embodiments have been illustrated and described herein, it will be appreciated by those of ordinary skill in the art that any arrangement which is calculated to achieve the same purpose may be substituted for the specific embodiments shown. For example, DHUs and DEUs are not limited to the receipt, selection and summing, splitting and transmitting of digitized wireless signals. In some examples of the present invention, DHUs and DEUs are capable of receiving, processing, selecting and summing analog wireless signals in addition to or instead of digitized wireless signals. As well, DHUs and DEUs may be capable of splitting, processing and transmitting analog wireless signals in addition to or instead of digitized wireless signals. This application is intended to cover any adaptations or variations of the present invention. Therefore, it is intended that this invention be limited only by the claims and the equivalents thereof.

What is claimed is:

1. A wireless distribution system, comprising:
a plurality of remote units distributed in a coverage area to receive wireless signals;
a plurality of input ports to receive signals comprising the wireless signals provided by the plurality of remote units;
a plurality of detectors operatively connected to one or more of the plurality of input ports to detect the presence of information carrying signals at the input ports,
a plurality of selection circuits to select the signals on input ports identified by the plurality of intelligent detectors as containing information carrying signals, wherein the signals containing information are selected to limit the total amount of system noise;
a node to combine the plurality of selected signals; and
a transmission link to transmit the signals combined at the node to at least upstream node where the combined signals may be further combined with other signals.

2. A wireless distribution system, comprising:
a plurality of remote units distributed in a coverage area to receive wireless signals;
a plurality of input ports to receive signals comprising the wireless signals provided by the plurality of remote units;
a plurality of detectors operatively connected to one or more of the plurality of input ports to determine the presence or absence of information carrying signals at the input ports;
a plurality of switches to select one or more of the signals received at the plurality of input ports in response to signals from one or more of the plurality of detectors, wherein the signals containing information are selected to limit the total amount of system noise;
a node to combine the signals selected from the plurality of input ports; and
a transmission link to transmit the signals combined at the node to at least one upstream node where the combined signals may be further combined with other signals.

3. The wireless distribution system of claim 2 wherein the detectors comprise threshold detectors.

4. The wireless distribution system of claim 2, further comprising a processor to process signals from one or more of the detectors to determine the presence of information.

5. The wireless distribution system of claim 4 wherein the processor comprises a correlator.

6. The wireless distribution system of claim 2, wherein the signals received at the input ports comprise a frequency spectrum that is digitized for distribution over the wireless distribution system.

7. The wireless distribution system of claim 6 wherein the digitized wireless spectrum is transmitted, at least in part, over a fiber optic transmission line.

8. A method for controlling the signal levels of a wireless distribution system, the method comprising:
receiving wireless signals at a plurality of remote units distributed in a coverage area;
providing signals from the remote units to a plurality of input ports;
detecting the presence of information carrying signals at the input ports, selecting the signals on input ports containing information carrying signals, wherein the signals containing information are selected to limit the total amount of system noise;

combining the plurality of selected signals; and transmitting, on a transmission link, the combined signals to a least one upstream node where the combined signals may be further combined with other signals.

9. The method of claim 8 wherein detecting the presence of information carrying signals at the input ports comprises thresholding.

10. A wireless distribution system, comprising:

a plurality of remote units distributed in a coverage area to receive wireless signals and to provide the wireless signals through the distribution system to one or more input ports;

a plurality of detectors operatively connected to the one or more input ports to detect the presence of information in signals received at the input port;

a plurality of selection circuits to select signals in which information has been detected, wherein the signals containing information are selected to limit the total amount of system noise;

a node to combine the selected signal; and a transmission link to transmit the signals combined at the node to at least one upstream node where the combined signals may be further combined with other signals.

11. The wireless distribution system of claim 10 wherein one or more of the detectors comprise a threshold detector.

12. The wireless distribution system of claim 10 wherein one or more of the detectors comprise a correlator.

13. A digital expansion unit, comprising:

a plurality of input ports to receive signals from a plurality of remote units distributed in a coverage area to receive wireless signals;

a plurality of detectors operatively connected to one or more of the plurality of input ports to detect the presence of information carrying signals at the input ports;

a plurality of selection circuits to select the signals on input ports identified by the plurality of intelligent detectors as containing information carrying signals;

a node to combine the plurality of selected signals; and a transmission link to transmit tile signals combined at the node to at least one upstream node where the combined signals may be further combined with other signals.

14. A digital expansion unit, comprising:

a plurality of input ports to receive signals from a plurality of remote units distributed in a coverage area to receive wireless signals;

a plurality of detectors operatively connected to one or more of the plurality of input ports to determine the presence of information carrying signals at the input ports;

a plurality of switches to select one or more of the signals received at the plurality of input ports response to signals from one or more of the plurality of detectors, wherein the signals containing information are selected to limit die total amount of system noise; end a node to combine the signals selected from the plurality of input ports; and a transmission link to transmit the signals combined at the node to at least one upstream nods where the combined signals may be further combined wit other signals.

15. A method for controlling the signal levels of a digital expansion unit, the method comprising:

receiving wireless signals at a plurality of input ports of a digital expansion unit;

detecting the presence of information carrying signals at the input ports;

selecting the signals from input ports containing information carrying signals;

combining the plurality of selected signals, wherein the signals containing information are selected to limit the total amount of system noise; and transmitting on a transmission link, the combined signals to a least one upstream node where the combined signals may be further combined with other signals.

16. A method for controlling the signal levels of a digital expansion unit, the method comprising:

receiving wireless signals at a plurality of input ports of a digital expansion unit;

measuring the strength of signals at the input ports;

selecting signals front input ports having a signal strength that is higher than a predetermined threshold, wherein selecting these signals is to limit the total amount of system noise;

combining the plurality of selected signals; and transmitting, on a transmission link, the combined signals to a least one upstream node where the combined signals may be further combined with other signals.

17. A wireless distribution system, comprising:

a plurality of remote units distributed in a coverage area to receive wireless signals;

a plurality of input ports to receive signals comprising the wireless signals provided by the plurality of remote units;

a plurality of detectors operatively connected to one or more of the plurality of input ports to determine the presence or absence of information carrying signals at the input ports, wherein the detectors comprise threshold detectors;

a plurality of switches to select one or more of the signals received at the plurality of input ports in response to signals from one or more of the plurality of detectors;

a node to combine the signals selected from the plurality of input ports: and a transmission link to transmit the signals combined at the node to at least one upstream node where the combined signals maybe further combined with other signals.

* * * * *